E. POSSON.
RAILWAY CAR.
APPLICATION FILED MAR. 9, 1907.
1,064,004.
Patented June 10, 1913.
12 SHEETS—SHEET 1.
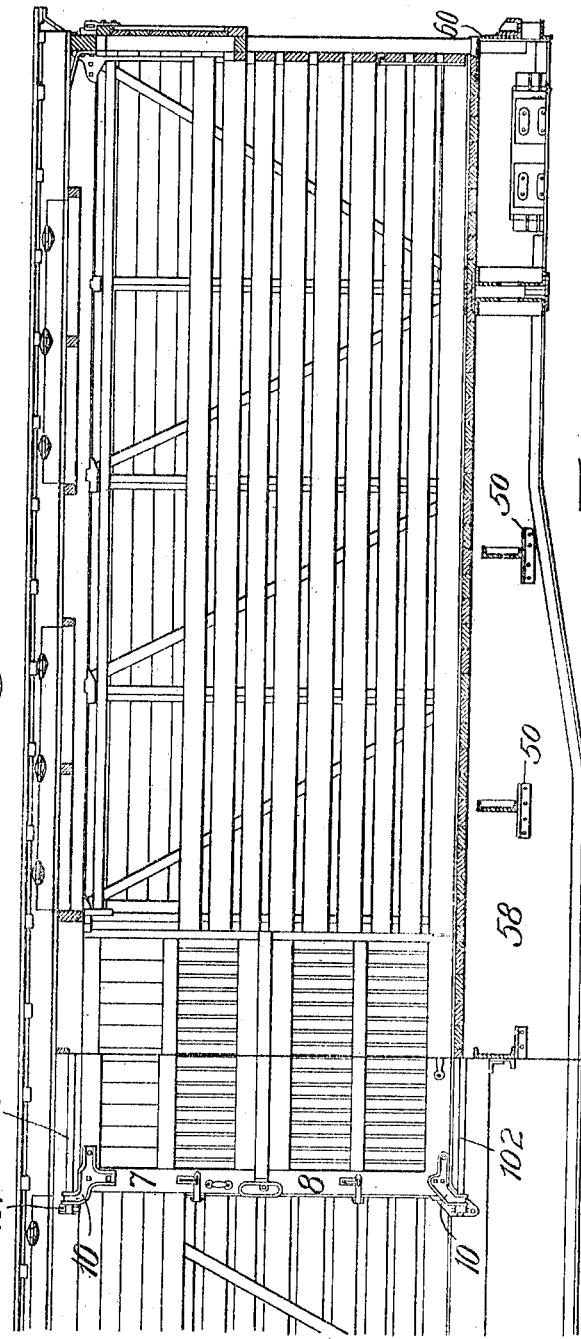
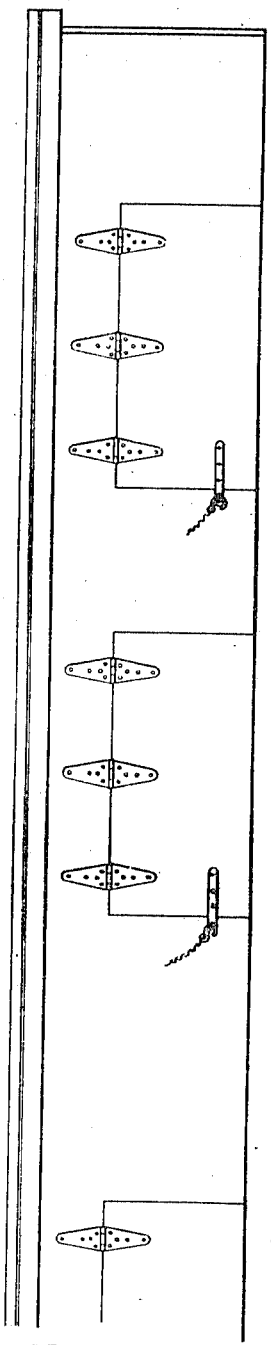
Witnesses:
Inventor
Edward Posson
By Thomas F. Sheridan
Atty

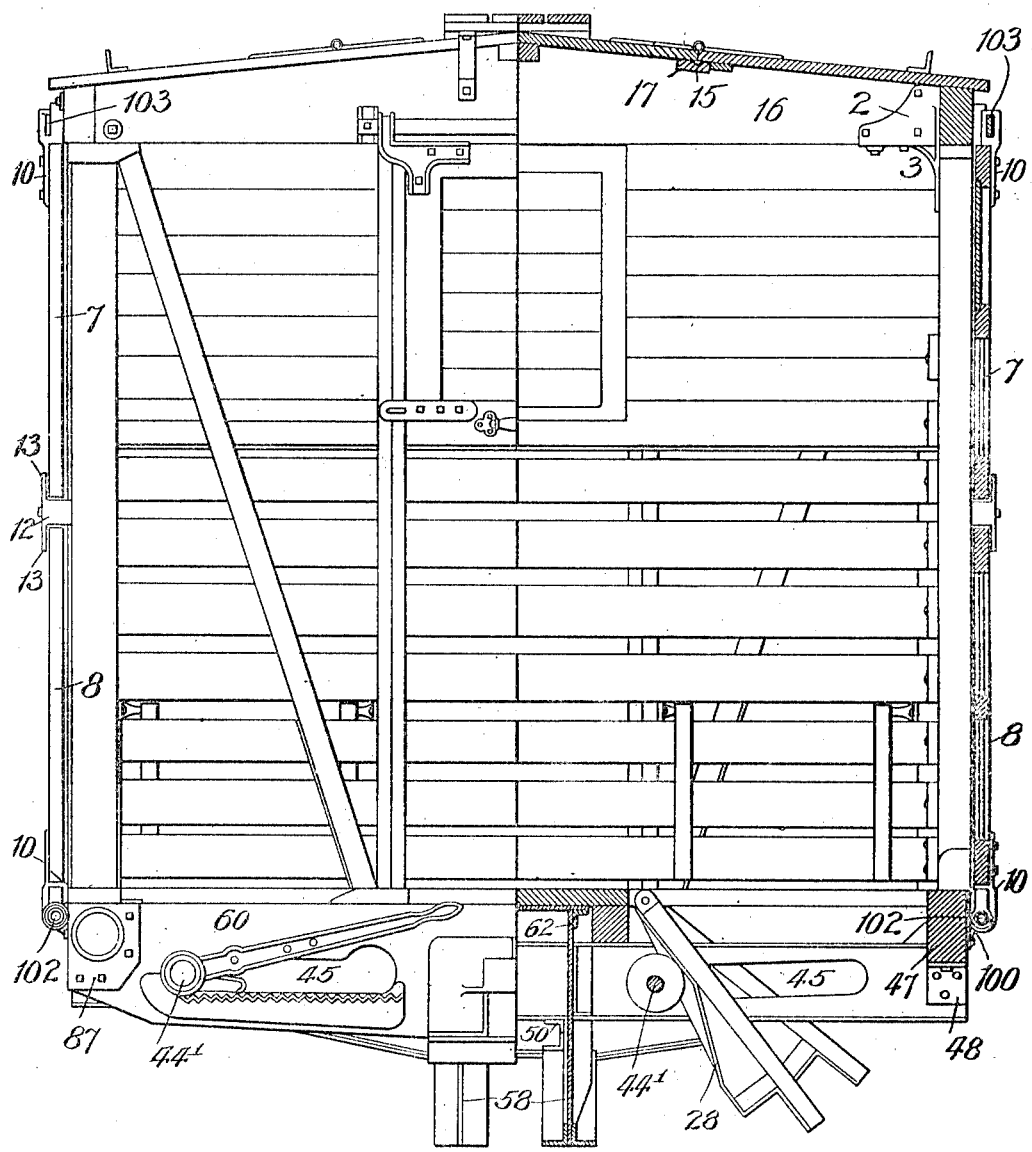

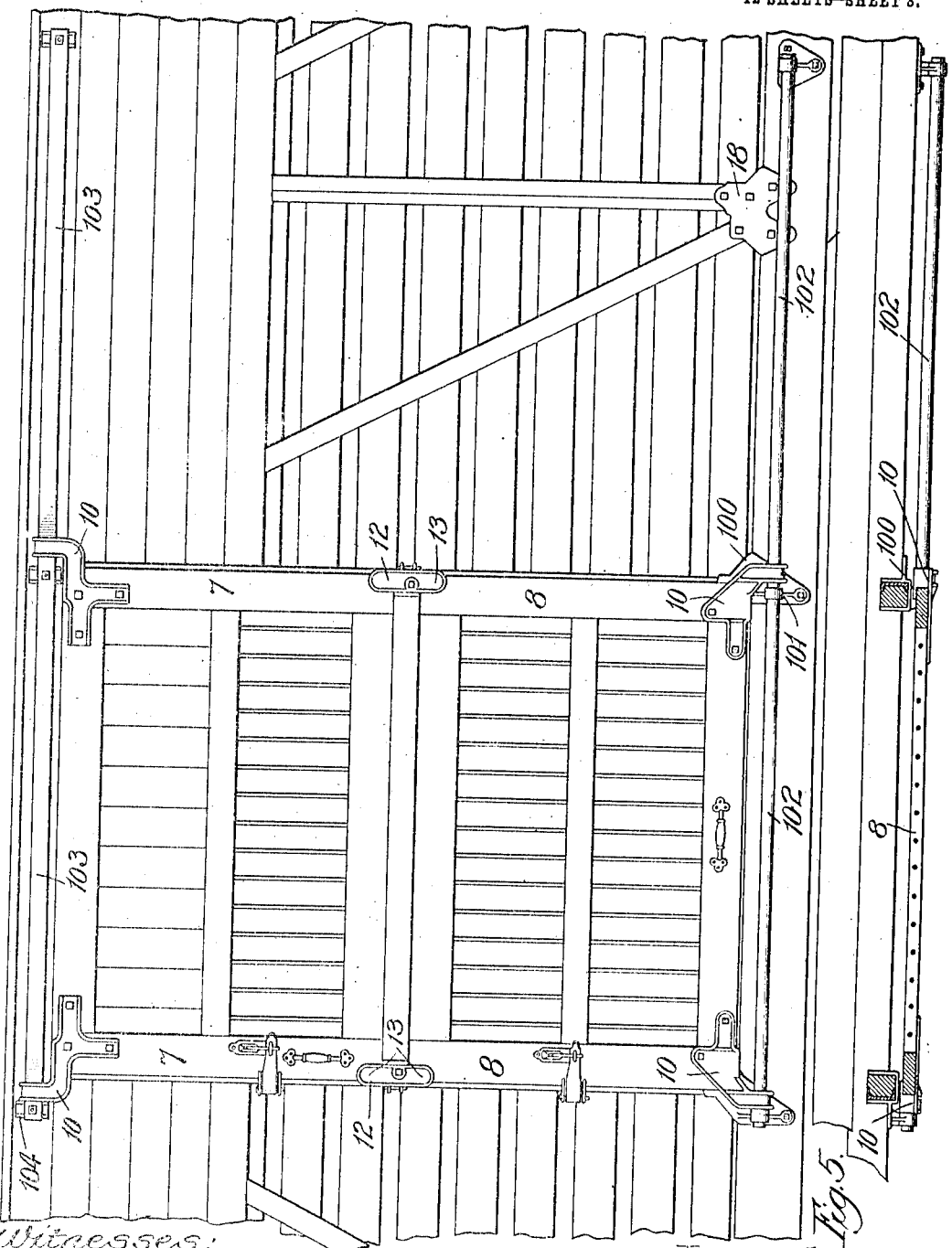

E. POSSON.
RAILWAY CAR.
APPLICATION FILED MAR. 9, 1907.
1,064,004.
Patented June 10, 1913.
12 SHEETS—SHEET 4.
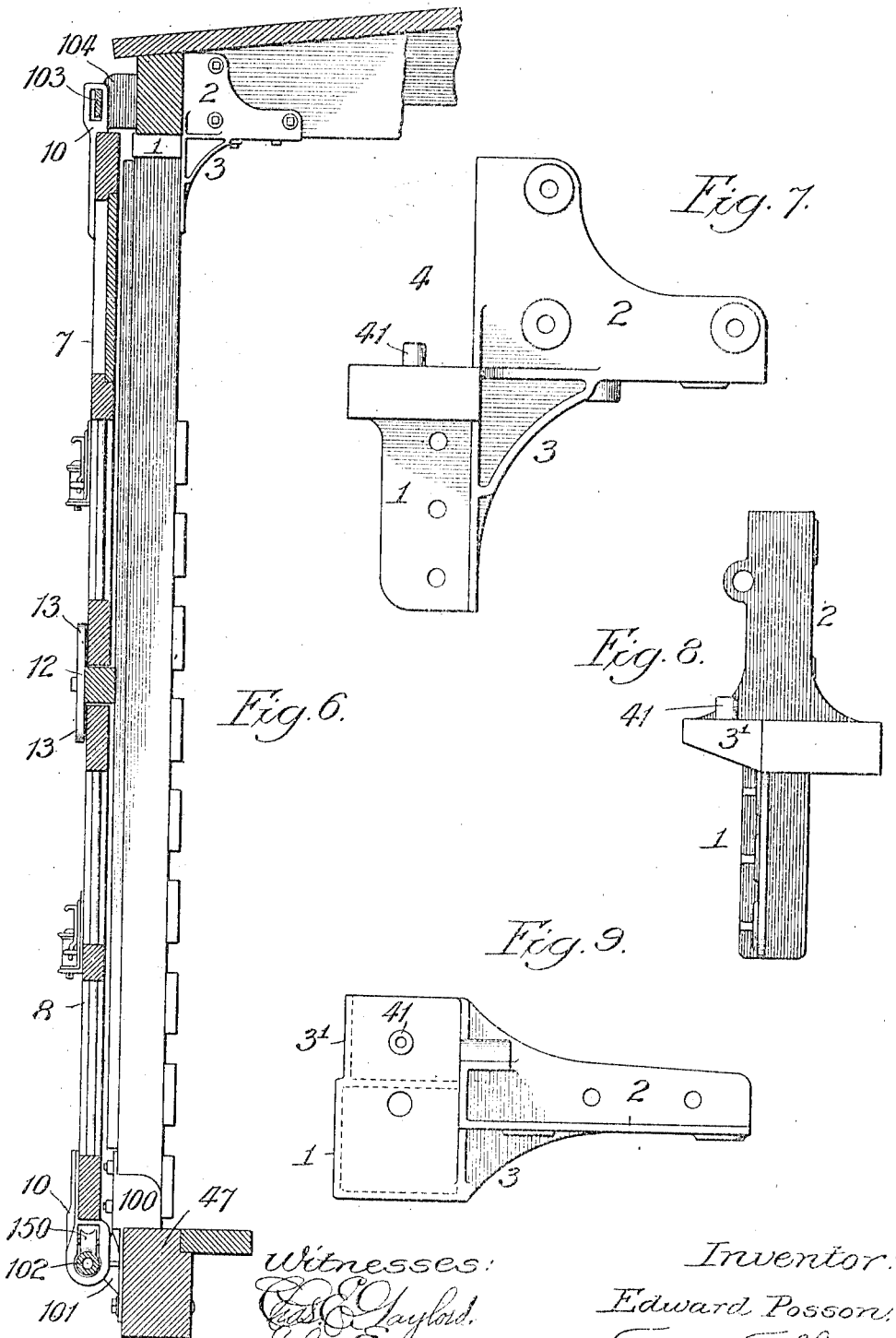
Witnesses:
Chas E Gaylord
John Enders
Inventor:
Edward Posson,
By Thomas F. Sheridan
Atty

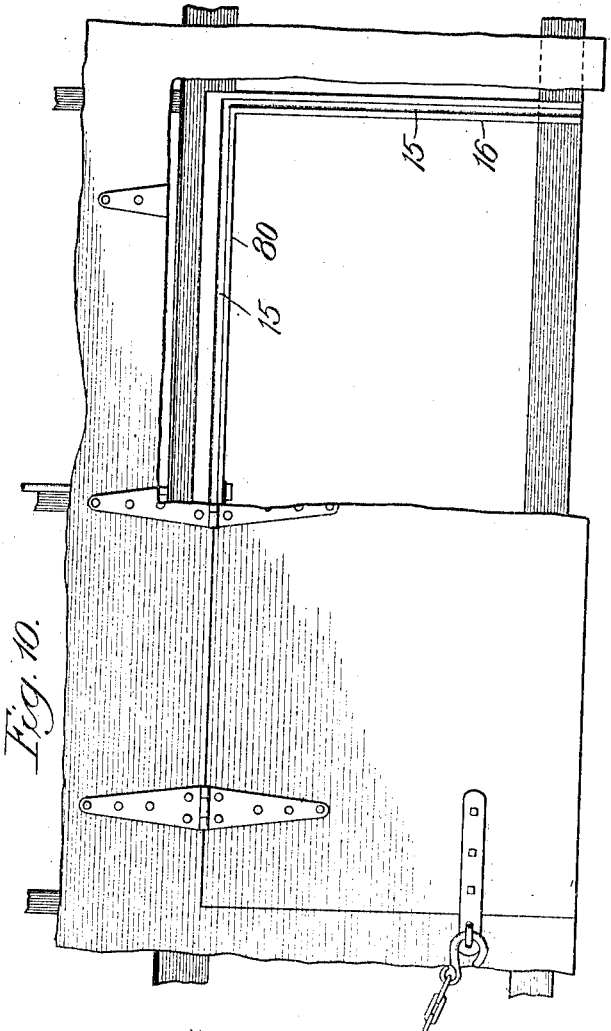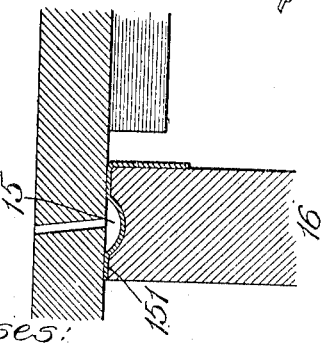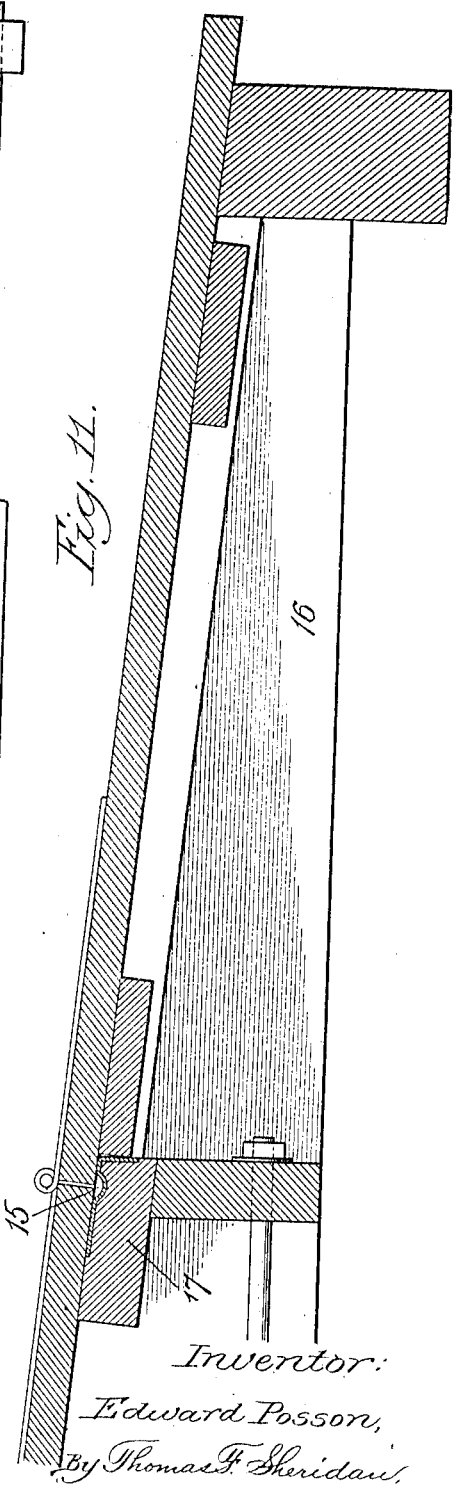

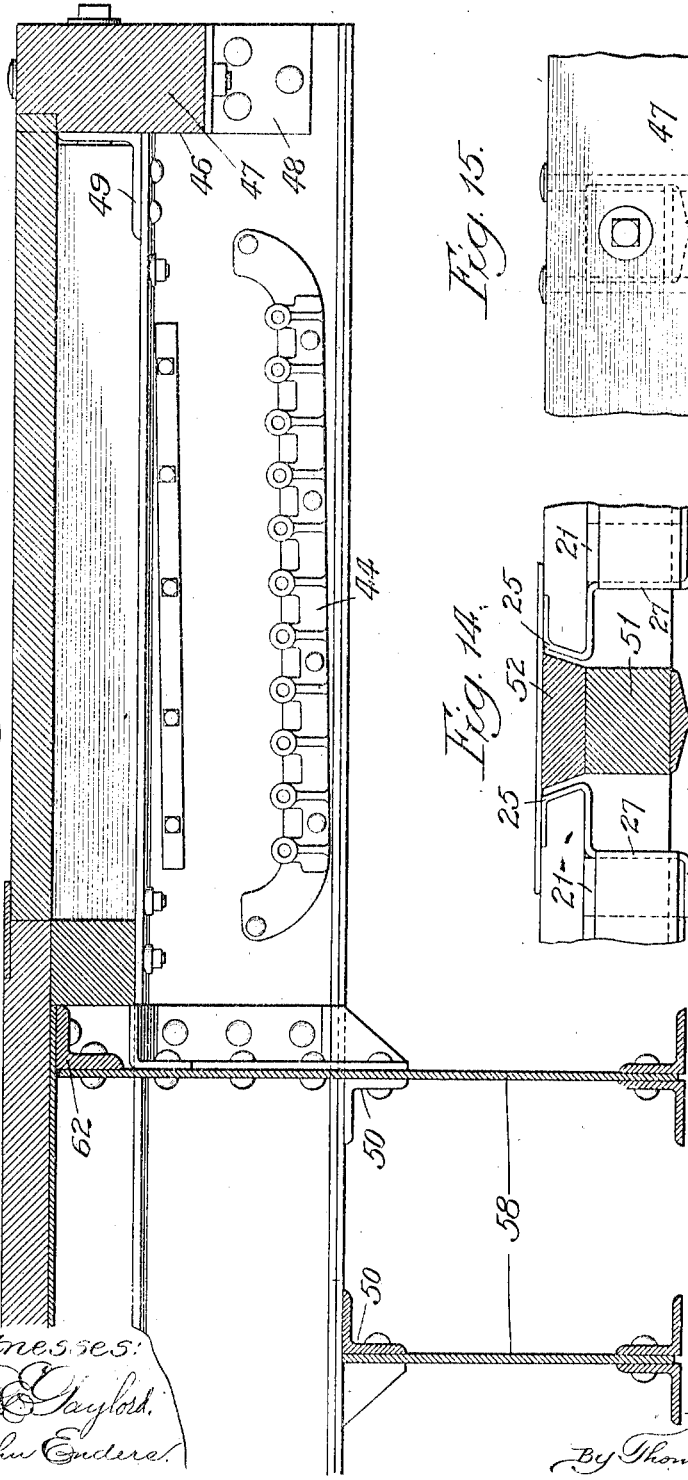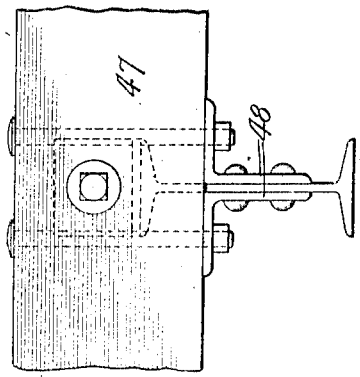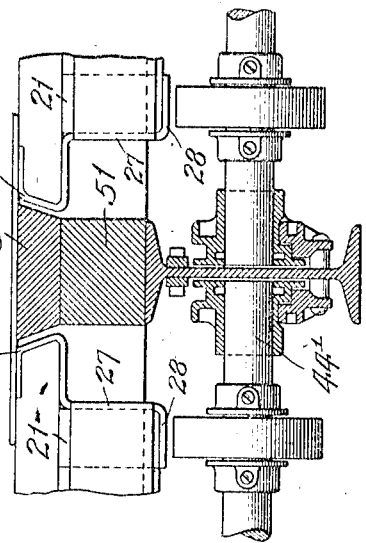

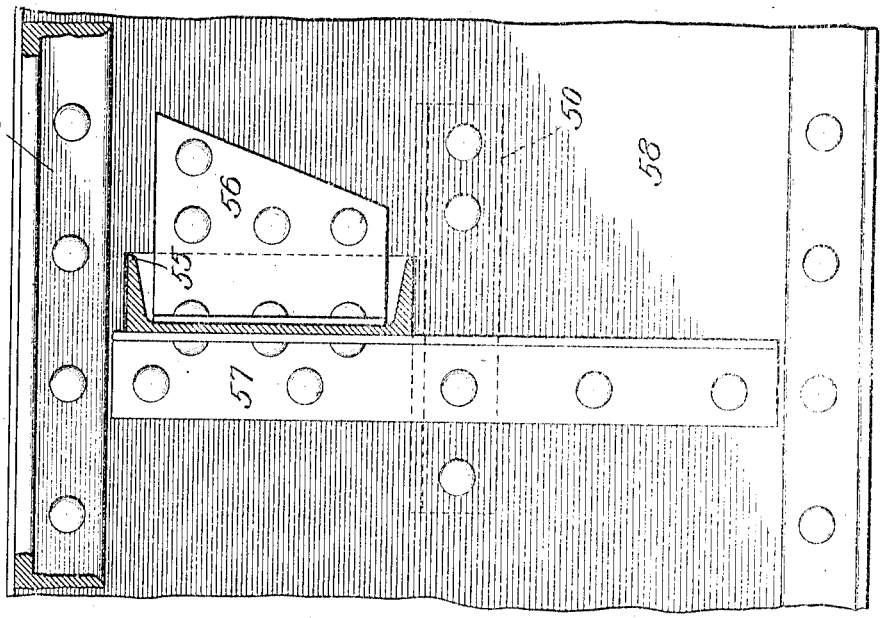
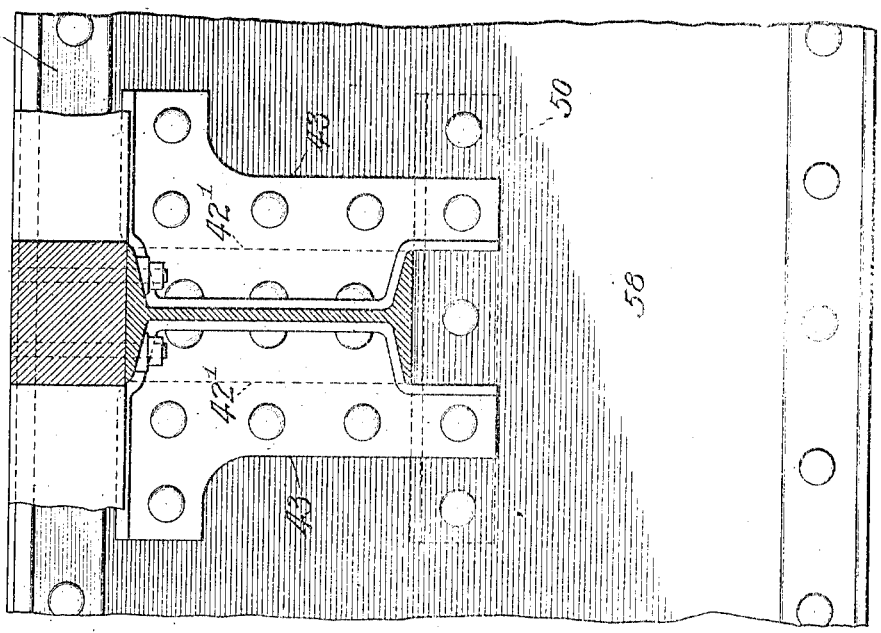

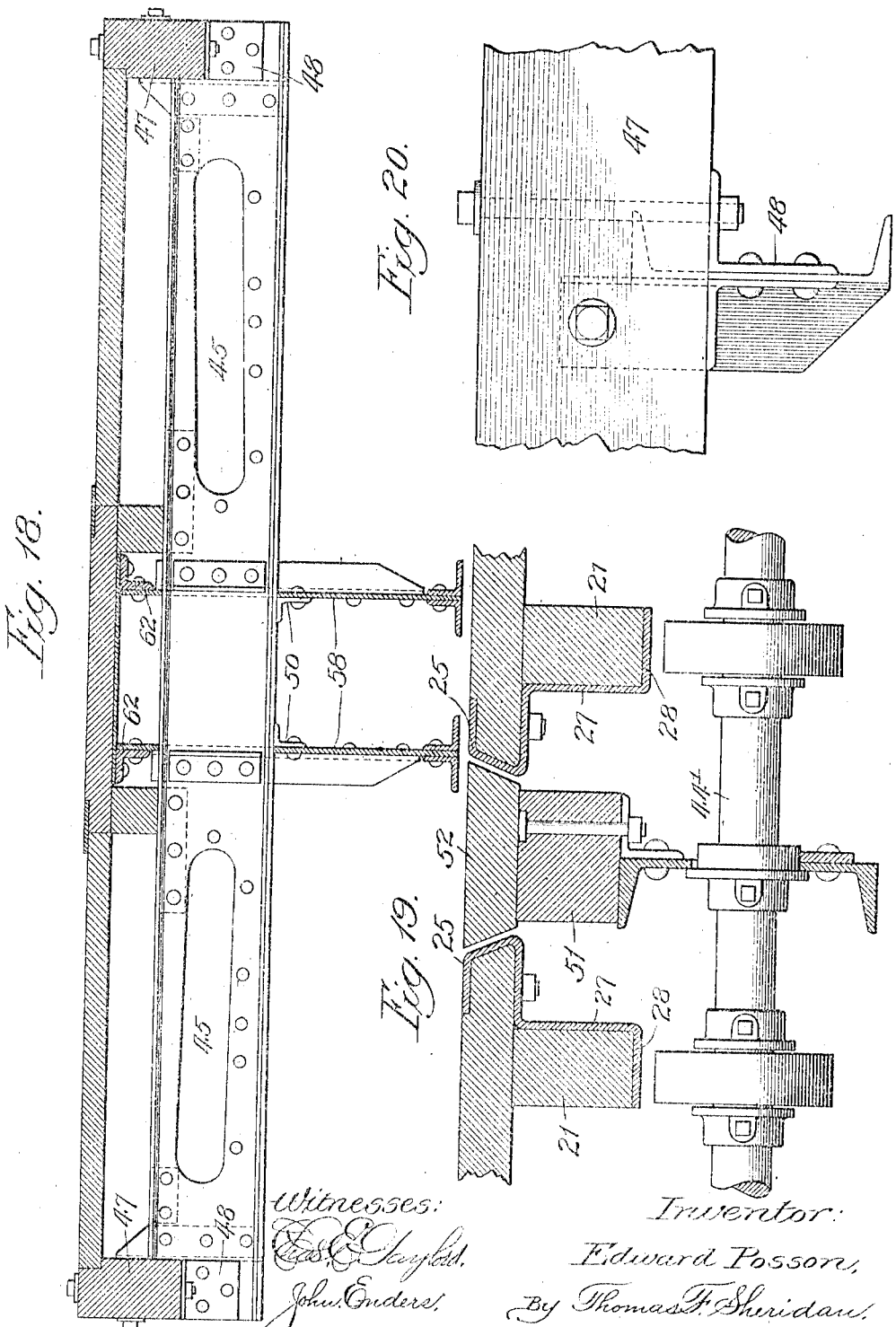

E. POSSON.
RAILWAY CAR.
APPLICATION FILED MAR. 9, 1907.
1,064,004.
Patented June 10, 1913.
12 SHEETS—SHEET 9.
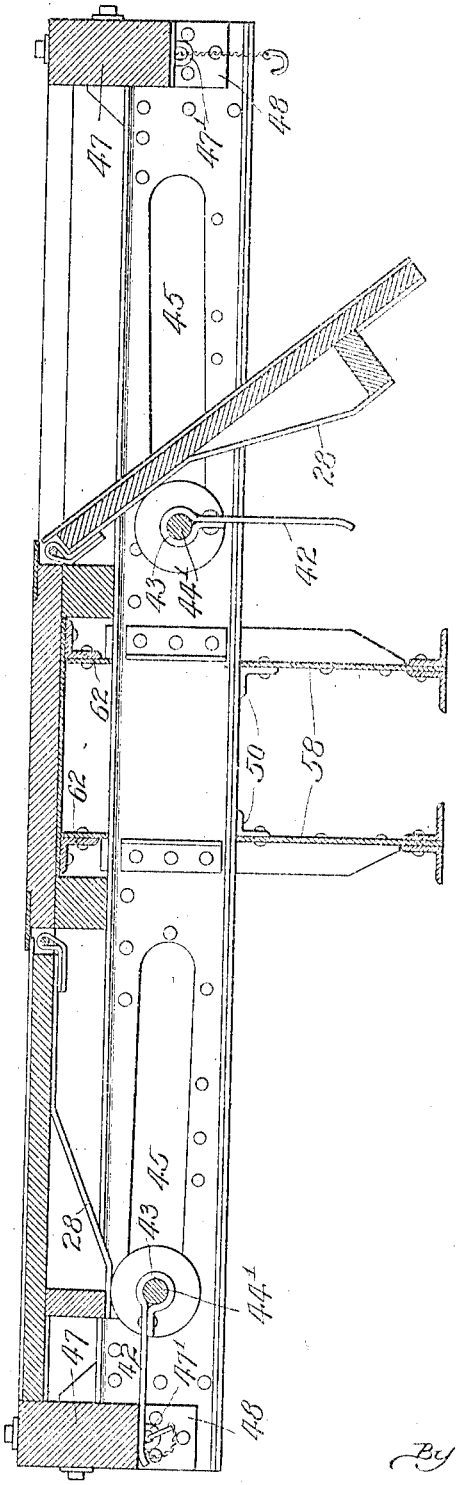
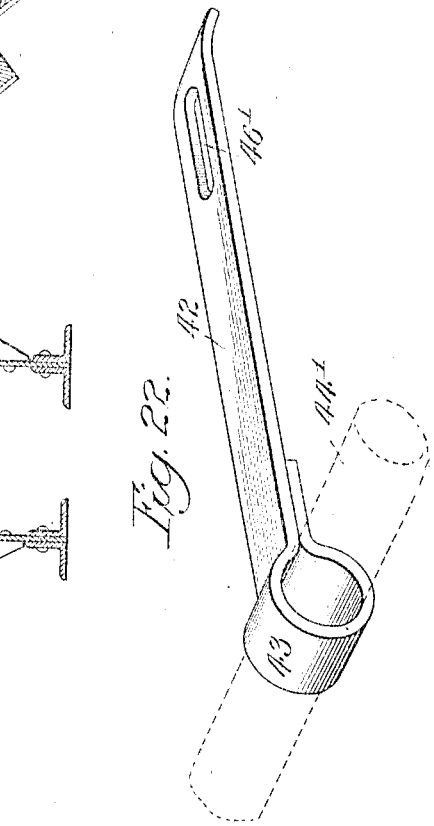
Witnesses:
Chas. E. Gaylord
John Enders
Inventor:
Edward Posson,
By Thomas F. Sheridan,
Atty.

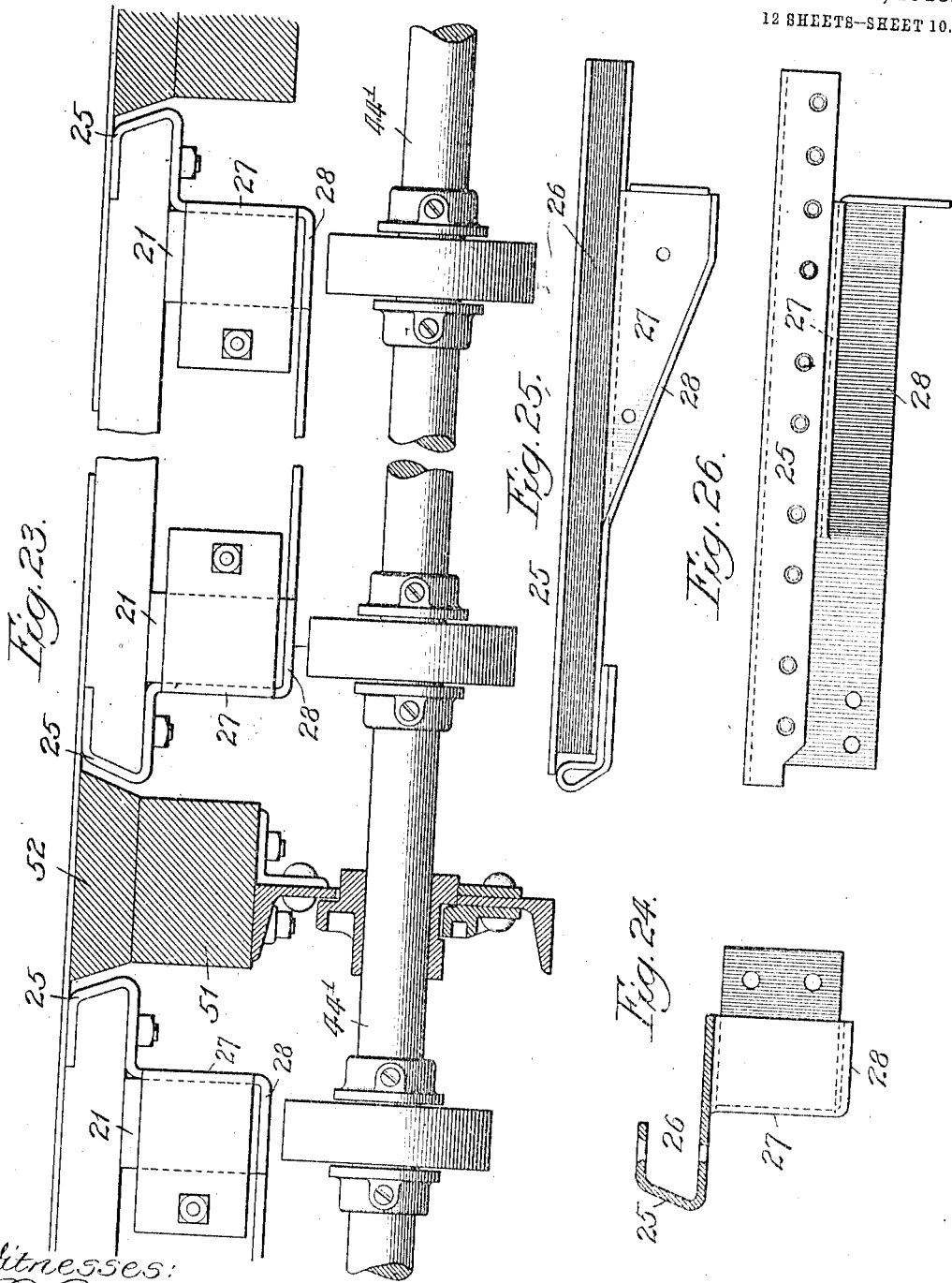

E. POSSON.
RAILWAY CAR.
APPLICATION FILED MAR. 9, 1907.
1,064,004.
Patented June 10, 1913.
12 SHEETS—SHEET 11.
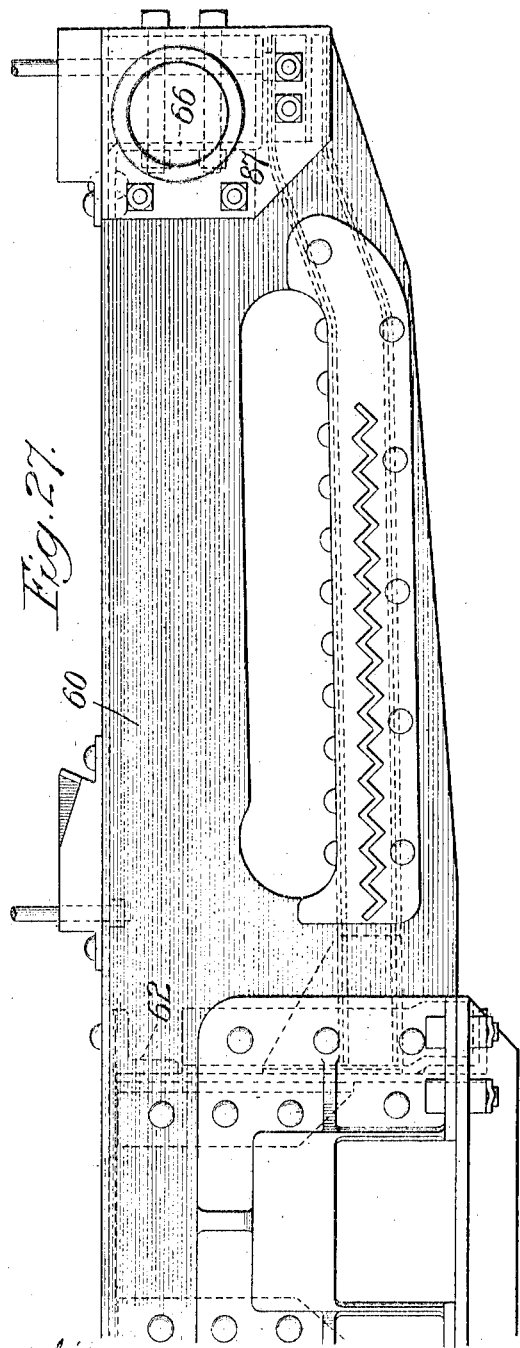
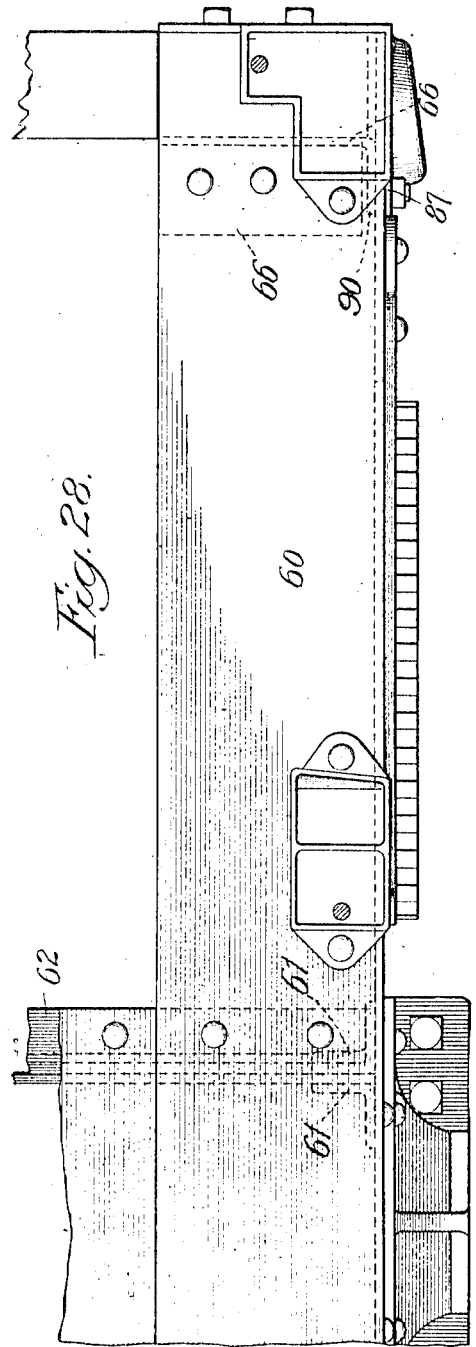
Witnesses:
Chas. E. Gaylord,
John Enders.
Inventor.
Edward Posson,
By Thomas F. Sheridan,
Atty.

E. POSSON.
RAILWAY CAR.
APPLICATION FILED MAR. 9, 1907.
1,064,004.
Patented June 10, 1913.
12 SHEETS—SHEET 12.
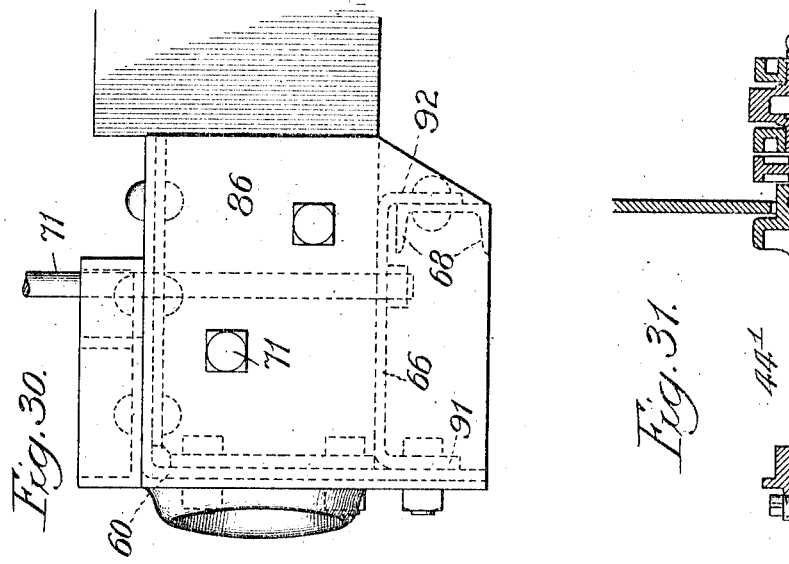
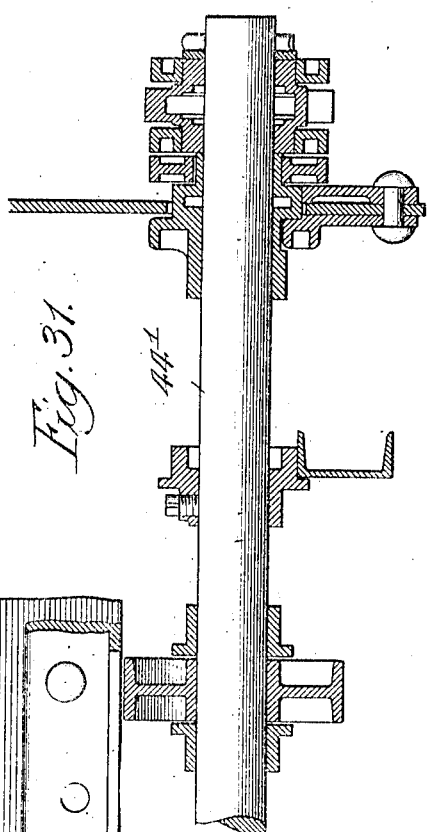
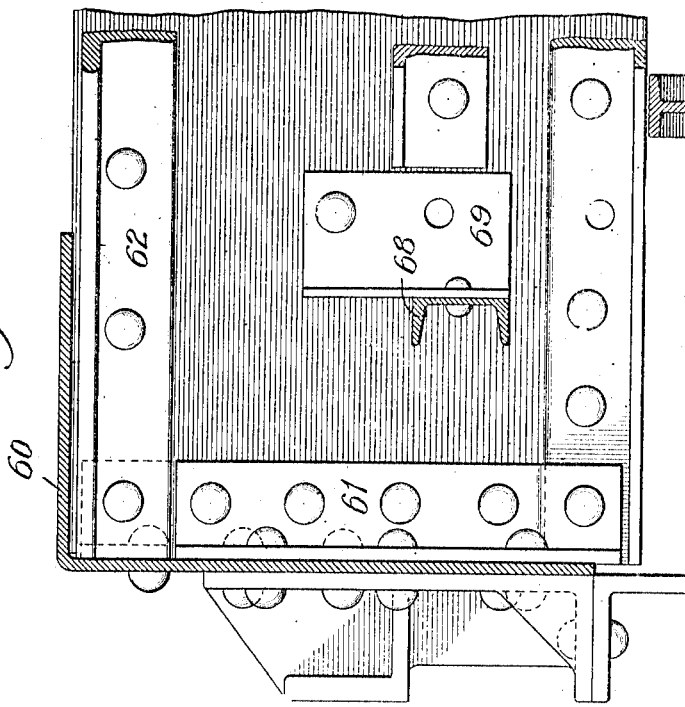
Witnesses:
Inventor:
Edward Posson,
By Thomas F. Sheridan,
Atty.

UNITED STATES PATENT OFFICE.

EDWARD POSSON, OF CHICAGO, ILLINOIS, ASSIGNOR TO NATIONAL DUMP CAR COMPANY, OF CHICAGO, ILLINOIS, A CORPORATION OF MAINE.

RAILWAY-CAR.

1,064,004.  Specification of Letters Patent.  Patented June 10, 1913.

Application filed March 9, 1907. Serial No. 361,581.

*To all whom it may concern:*

Be it known that I, EDWARD POSSON, a citizen of the United States, residing at Chicago, in the county of Cook and State of Illinois, have invented certain new and useful Improvements in Railway-Cars, of which the following is a specification.

The object of my invention is to provide an improved stock car provided with dumping doors and roof doors.

As will more clearly appear from the accompanying drawings and following description, my invention consists in improvements in the general structure of the car. Among other things I have provided a side door made in sections, the upper and lower half being independent in their movements from open to closed position; also a combined door post cap and carline pocket. For the purpose of properly draining the roof of the car without the possibility of water entering the interior through the upper doors provided in the roof, I have grooved the carlines and longitudinal roof members surrounding the door openings. I have also improved the construction of the dumping door in the floor of the car by forming the inclines of the door as an integral part of the pressed steel edges of the door. Means are also provided with my improved car for locking and applying a seal to the operating shaft of the dump doors when in closed position. The crossties of my improved car are continuous from side to side and the side sill is so secured as to be easily removed, as are also the side post pockets.

In the drawings—Figure 1 is a side elevation partly in section of part of my improved car. Fig. 2 is a plan view of a part of the roof of the same. Fig. 3 is an end view partially in section of the car. Fig. 4 is a side elevation of one of the doors and the adjoining parts of the side of the car. Fig. 5 is a horizontal section of the parts shown in Fig. 4 and exhibits the construction of the side door post shoes. Fig. 6 is a transverse vertical section through one of the side doors. Figs. 7 and 8 are elevations of the door post cap and carline pocket. Fig. 9 is a plan view of the same. Fig. 10 is a plan view of one of the roof doors. Fig. 11 is a sectional elevation of the same. Fig. 12 is a sectional view showing the groove in one of the carlines. Fig. 13 shows the construction of the center cross-tie. Fig. 14 is a transverse section of the same showing the door operating racks. Fig. 15 is an end view of the center crosstie showing the mode of joining it to the side sill. Fig. 16 is a sectional view of the center crosstie showing its attachment to the center sill. Fig. 17 is a view similar to Fig. 16 but showing one of the intermediate crossties in section. Fig. 18 is an elevation of one of the intermediate crossties. Fig. 19 is a cross sectional view of the crosstie shown in Fig. 18, and also of the adjacent edges of the dump doors, and the shaft for operating them. Fig. 20 shows the outer end of the crosstie illustrated in Figs. 18 and 19 and illustrates the mode of supporting the side sill upon the same. Fig. 21 is a sectional view showing the dumping doors and the shaft for operating them and the hasp. Fig. 22 is a detail view showing the hasp. Fig. 23 is a transverse sectional view of the dumping doors and operating shaft showing in section one of the crossties. Figs. 24, 25 and 26 are detail views of the pressed steel members which reinforce the edges of the doors and provide a bearing surface for the inclines upon the lower sides thereof. Fig. 27 is an elevation of the end sill. Fig. 28 is a plan view of the same. Fig. 29 is a cross section taken at about the center of the end sill. Fig. 30 shows the construction of the corner bands at the extremities of the end sills. Fig. 31 shows the operating shaft and improved means for supporting it inside of the end sill.

My improved side door post cap and carline pocket is shown in detail in Figs. 6 to 9. The carline pocket 2 is disposed at right angles to the door post cap 1 and is formed integral therewith. The connection between these parts is strengthened by means of the bracket 3. The door post cap consists of a rectangular socket 1 adjoining which is a pocket 3' for the diagonal member of the side frame. The upper longitudinal member of the car is seated in the rectangular recess 4 between the carline pocket 2 and the door post cap 1. A stud 41 projecting from the lower wall of this recess is provided for the purpose of firmly holding the longitudinal timber seated thereon. The carline pocket and door post cap are provided with bolt holes, as customary for the purpose of securing the parts seated therein. The door post pockets 100 are provided with brackets 101 for supporting the lower door rail 102. The upper door rail 103 is supported upon brackets 104.

As shown in Figs. 1 to 4 of the drawings, the side door is constructed in two sections 7 and 8, the upper and lower halves sliding independently. The upper half of the door is supported by a rail. The lower section of the door is provided at its lower edge with rollers 150 mounted in brackets 10 suitably secured to the door. These rollers bear upon a rail which may consist of ordinary iron piping secured to the side of the car. Secured to the door posts are plates 12 having overhanging portions 13 for the purpose of holding the edges of the doors against the side of the car. It will be obvious that when the doors are opened they will be securely held in place by the supporting guide-rails and one of the plates 12.

In Figs. 10 to 12 my improved construction for draining the car roof and avoiding the possibility of water entering the interior thereof is shown. Grooves 15 which may be lined with sheet metal 151 are formed in the carlines 16 and also in the longitudinal roof members 17. These grooves are formed immediately beneath the edges of the doors for the purpose of catching and carrying off any water which may leak through at that point. The carlines as ordinarily constructed have the necessary slope to carry off the water falling in the grooves therein, and the grooves in the longitudinal members 80 may be given the necessary slope by making their depth increase from the center of the doors toward the outside edges.

The side post pockets 18, shown in Fig. 4 of the drawings are bolted to the outside of the side sill, as shown, and to the side posts of the car. By this construction the side posts when broken may be easily replaced by simply removing the bolts and taking off the side pocket.

As shown in Figs. 19 and 23 of the drawings, the edges of the dumping doors are reinforced by plates of pressed steel 25 bent to conform to the shape of the door. It has been customary to construct the inclined tracks shown in Fig. 21, of separate castings. In my improved construction, however, I form these tracks of wooden blocks 21 reinforced upon their edges by a continuation of the pressed steel member 25. The precise form of the member 25 is shown in Figs. 24, 25 and 26 of the drawings. These members consist of an upper channel shape portion 26 to receive the edge of the door, and downturned vertical part 27 upon which is formed the inclined flange 28, the latter forming the track with which the door operating mechanism contacts.

The dumping doors with which my improved car is provided are of the type operated by a transversely moving shaft contacting with inclined surfaces on the under sides of the doors. My improved hasp for securing the shafts in the position occupied when the doors are closed, is shown in Figs. 21 and 22 of the drawings. This hasp consists of a metal strap 42 bent at one end to form an eye 43 encircling the operating shaft 44'. The hasp swings freely upon the operating shaft and when the shaft is moved to the outer end of the slot 45 in the crosstie, the hasp may be swung into horizontal position in such manner that a slot 46' in its outer end will pass over a staple 47' on the under side of the side sill. The hasp and shaft may be secured in this position by means of a hook passing through the staple beneath the hasp, or if desired a lock may be employed in place of the hook, thus preventing the opening of the doors by unauthorized parties. The hasp and staple also afford a convenient means for applying the usual car seal to the doors.

I have also provided my car with crossties of improved form. The center crosstie is shown in detail in Figs. 13 to 16 of the drawings. This member consists preferably of an I-beam extending throughout the width of the car and passing through openings in the vertical webs of the center sill. The opening in the web of the center sill is rectangular in form, as shown by the dotted lines 42' in Fig. 16. The vertical webs of the center sill are reinforced and attached to the crosstie by means of angle plates 43 bent to conform to the flanges upon the I-beam forming the crosstie. The plates 43 are riveted to the vertical web of the center sill and to the web of the I-beam forming the crosstie. The crosstie is further supported at the point where it passes through the center sill by angle irons 50 riveted to the inside of the vertical webs forming the center sill. At 44, Fig. 13, I have shown the rack of the door operating mechanism, but further reference thereto is unnecessary as this forms no part of my invention. The outer end of the crosstie is formed with a right-angular recess 46 for the purpose of receiving the side sill 47, which rests upon the angle irons 48 secured to the web of the I-beam immediately below the recess. The side sill is bolted to the angles 48 and also to the angle 49 seated upon the top of the I-beam. The usual transverse timbers 51 and flooring 52 are seated upon the upper surface of the crosstie occupying the space between adjacent dump doors.

The intermediate crossties are similar in general construction to the center crosstie, but consists of channel irons instead of the I-beam used for the center tie. The intermediate crossties, as shown in Figs. 17 and 18 of the drawings are secured to the center sill by means similar to those employed for the center crosstie. The angle plates 56 and 57 whereby the channel forming the crosstie is attached to the webs 58 are somewhat different in form from those used with the center crosstie. The angle 57 lies against the flat face of the channel 55. The angle plate 56 is not bent to conform to the flanges of the channel 55, but is of a width sufficient to cover the web of the channel merely. As in the case of the center crosstie, angle irons 50 inside of the webs of the center sill assist in supporting the intermediate crossties and reinforce the center sill.

The construction of the end sill and of the means for supporting the operating shaft inside of the end sill are shown in Figs. 27 to 31 of the drawings. The main body of the end sill consists of a steel plate 60 bent into right-angular form, the vertical web of which is secured to the vertical webs of the center sill by means of angle irons 61. The horizontal top plate of the end sill is similarly secured to the center sill by means of angle irons 62. The construction of the corner band is such that it may readily be removed and when so removed the side sill can be taken out and replaced without disturbing other parts of the structure. The corner band consists of the parts 86 and 87 embracing the corner of the sill. Riveted to the under side of the top plate of the sill is the Z-plate 66 shown in Figs. 27, 28 and 30 the lower horizontal part of which forms a seat for the side sill. The vertical part of the Z-plate 66 is provided with a flange 90 which lies against the inner face of the end sill and is secured thereto by bolts which also pass through the end band, thus securing all of these parts together. The horizontal part of the Z-plate 66 is provided with a similar flange 91 which is secured to the end sill and corner band by bolts as in the case of the flange on the vertical part above referred to. Bolts 71 secure the side sill in position. By removing the bolts 71 and those holding the corner band to the sill the corner band may be removed and the side sill taken out and replaced when necessary. The horizontal part of the Z-plate 66 is also provided with an inner flange 92 to which is riveted the channel iron 68, which is provided for the purpose of supporting the door operating shaft at a point intermediate the end sill and the bolster. The channel iron 68 is secured at its inner end to the center sill by means of angle irons 69, shown in Fig. 29.

I claim:

1. In a car, a roof door, carlines, and longitudinal roof members surrounding the door opening, said carlines and longitudinal members being formed with grooves beneath the edges of the door, the groove in the longitudinal members sloping toward the carlines.

2. In a car, a dump door provided with a projection on its under surface adapted to co-act with the door operating mechanism, and a metal casing embracing the edge of the door and said projection.

3. In a car, a dump door provided with an incline on its under surface, and an integral metal casing embracing the edge of the door and said incline.

4. In a dump car, a door operating shaft, a radially projecting latch pivotally mounted thereon, and means for securing the latch to the side sills.

5. In a dump car, a staple upon a stationary part of the car, a door operating shaft, and a member pivoted thereon having a slot adapted to be passed over said staple.

6. In a dump car, a reciprocating door operating shaft, and a radially projecting latch pivotally mounted thereon for securing said reciprocating shaft directly to a fixed part of the car when said shaft is in one of its extreme positions.

7. In a car, a center sill comprising a vertical web a cross sill consisting of a continuous I-beam extending across the car through apertures in the center sill, angle plates bent to conform to the web and flanges of said I-beam and secured thereto and to the center sill, and longitudinal floor-supporting members on said cross-sill.

8. In a car, an underframe comprising a center sill, end sills, bolsters, and intermediate cross bearers, the cross bearers extending continuously from side to side of the car and passing through apertures in the center sill, the center cross bearer consisting of an I-beam, and the other intermediate cross bearers being formed of channel irons.

9. In a car, an underframe comprising a center sill, end sills, bolsters, and intermediate cross bearers, the cross bearers extending continuously from side to side of the car and passing through apertures in the center sill, the center cross bearer consisting of an I-beam, angle irons conforming to the web and flanges of the I-beam for securing the same to the center sill, and the other intermediate cross bearers consisting of channels, and angle irons for securing said channels to the center sill.

10. In a car, an end sill comprising horizontal and vertical plates, a side sill, a seat for the side sill depending from and secured to said horizontal plate, and a corner band removably secured to said vertical plate and to said seat.

11. In a dump car, a reciprocatory door operating shaft, slots in the transverse members of the underframe for supporting said shaft, and an intermediate support therefor between the end sill and the bolster.

12. In a dump car, an end sill, a bolster and a center sill, a reciprocatory door operating shaft, and a support therefor between the end sill and the bolster, said support being secured to the center sill and to the end sill.

13. In a dump car, a center sill, bolsters and end and side sills, a seat for the side sill depending from the end sill, a reciprocatory door operating shaft, and a support therefor between the end sill and bolster, said support being secured to the center sill and side sill seat.

14. In a car having a door on each side, door posts, caps for said door posts, said caps having pockets for the carline, and a carline resting in said pockets and connecting the door post caps on opposite sides of the car.

15. In a car structure, a door post cap having sockets for the door post and for the carline.

16. In a car structure, a door post cap comprising a downwardly projecting socket for the door post, a horizontally projecting socket for the carline, and a bracket reinforcing the connection between said sockets.

17. In a car, a door post, a carline, a diagonal and a longitudinal side frame member, and a door post cap having sockets for said door post, carline and side frame members.

18. In a car structure, a door post, a carline and a longitudinal side frame member, a door post cap comprising a downwardly projecting socket for the door post and a horizontally projecting socket for the carline, the angular space between said sockets being adapted to receive the longitudinal side frame members.

EDWARD POSSON.

Witnesses:
W. A. Scott,
Charles F. Tilts.